United States Patent
Klein

(10) Patent No.: US 7,522,741 B2
(45) Date of Patent: Apr. 21, 2009

(54) ELECTRO-ACOUSTIC APPARATUS COMPRISING AN ELECTRO-ACOUSTIC TRANSDUCER

(75) Inventor: Erich Klein, Himberg (AT)

(73) Assignee: NXP B.V., Eindhoven (NL)

( * ) Notice: Subject to any disclaimer, the term of this patent is extended or adjusted under 35 U.S.C. 154(b) by 421 days.

(21) Appl. No.: 10/580,055

(22) PCT Filed: Nov. 24, 2004

(86) PCT No.: PCT/IB2004/052523

§ 371 (c)(1),
(2), (4) Date: May 22, 2006

(87) PCT Pub. No.: WO2005/053353

PCT Pub. Date: Jun. 9, 2005

(65) Prior Publication Data

US 2007/0147646 A1    Jun. 28, 2007

(30) Foreign Application Priority Data

Nov. 25, 2003    (EP)    ................................. 03104360

(51) Int. Cl.
*H04R 1/02*    (2006.01)

(52) U.S. Cl. ....................................... 381/338; 381/351
(58) Field of Classification Search ............ 379/428.01, 379/433.02; 181/148, 160, 171, 184; 455/575.1, 455/575.3, 575.4; 381/334, 337, 338, 345, 381/351, 380, 386, 387, 388, 395
See application file for complete search history.

(56) References Cited

U.S. PATENT DOCUMENTS 7,058,366 B2 *    6/2006    Patterson ..................... 381/380

* cited by examiner

*Primary Examiner*—Brian Ensey

(57) ABSTRACT

In the case of an electro-acoustic apparatus (1) having a housing (2) with a housing wall (9) and having an electro-acoustic transducer (17) that is arranged facing the housing wall (9), a front chamber volume (31) that forms an acoustic spring is provided between the transducer (17) and the housing wall (9), and in the housing wall (9) a sound outlet aperture (14, 15) that preferably forms an acoustic mass is provided, wherein between the front chamber volume (31) and the sound outlet aperture (14, 15) a sound guide channel (38, 39) is provided, which forms a sufficiently large acoustic mass in order jointly with the front chamber volume (31) to achieve a satisfactory band-pass characteristic of the sound pressure frequency response of the transducer (17).

4 Claims, 5 Drawing Sheets

ELECTRO-ACOUSTIC APPARATUS COMPRISING AN ELECTRO-ACOUSTIC TRANSDUCER

The invention relates to an electro-acoustic apparatus having a housing with a housing wall that is defined by an inner wall surface, and having an electro-acoustic transducer that is arranged facing the inner wall surface, wherein the transducer is provided and constructed to generate sound and to emit the generated sound in a sound output direction right through a front chamber volume.

Such an electro-acoustic apparatus, which is in the form of a so-called mobile telephone, is known, for example, from the patent document WO 01/060530 A1. In the known apparatus, a plurality of sound transmission apertures running in a sound output direction are provided in the housing wall, which sound transmission apertures are arranged, when looking in the sound output direction, within a hollow-cylindrical raised portion, which is formed in one piece with the housing wall and projects from the housing wall into the apparatus interior. Adjoining this raised portion is the electro-acoustic transducer, namely, a small loudspeaker. The transducer emits the sound it generates in the sound output direction into the space surrounded by the raised portion, the space surrounded by the raised portion forming the so-called front chamber volume for the transducer. This front chamber volume forms an acoustic spring, and the air present in the sound outlet apertures forms an acoustic mass. Here, the dimensions of the front chamber volume and of the sound outlet apertures are selected so that the front chamber volume and the sound outlet apertures form a so-called front resonator, which in respect of its sound pressure frequency response has a band-pass characteristic that is limited at a frequency of normally about 3.4 kHz. This technical fact has been known for many years not only in the case of the electro-acoustic apparatus known from the patent document WO 01/060530 A1 but also in the case of a multitude of electro-acoustic apparatuses, especially mobile telephones, which have been brought onto the market.

Provided that the electro-acoustic transducer in an electro-acoustic apparatus, such as an apparatus known, for example, from the patent document WO 01/060530 A1, has a relatively large diameter, consequently enabling its front chamber volume to be made relatively large, and provided that the housing wall, which is provided with at least one sound transmission aperture, has a relatively large wall thickness, namely, at least 1.5 mm or more, there are virtually no significant problems in realizing a satisfactory front resonator and consequently in achieving a satisfactory band-pass characteristic for the sound pressure frequency response.

Research following developments of an electro-acoustic apparatus of the kind mentioned in the first paragraph has revealed that the known solutions do not yield satisfactory results when the diameter of the electro-acoustic transducer is reduced compared with known electro-acoustic transducers and when the wall thickness of the housing walls of an electro-acoustic apparatus, that is, the wall thickness of the housing wall that lies opposite an electro-acoustic transducer inside the apparatus, is reduced. Under these circumstances, then because the front chamber volume is realizable only with a relatively small volume content and because the sound transmission apertures are of short construction owing to the thin wall thicknesses, it is impossible to achieve a satisfactory front resonator when this is attempted using the known solutions.

It is an object of the invention to solve the above-described problem and to realize an improved electro-acoustic apparatus in which even for the case in which only a small front chamber volume is available and only thin housing walls are present, a satisfactory front resonator can be achieved and consequently a satisfactory band-pass characteristic for the sound pressure frequency response can be ensured.

To achieve the above-mentioned object, in the case of an electro-acoustic apparatus according to the invention features according to the invention are provided so that an electro-acoustic apparatus according to the invention is characterizable in the manner specified hereinafter, namely:

Electro-acoustic apparatus having a housing with a housing wall that is defined by an inner wall surface, and having an electro-acoustic transducer that is arranged facing the inner wall surface, wherein the transducer is provided and constructed to generate sound and to emit the generated sound in a sound output direction right through a front chamber volume, and wherein inside the apparatus a sound transmission volume is provided, through which the generated sound channeled right through the front chamber volume can be channeled at least partially in the sound output direction, and wherein in the housing wall there is provided a sound outlet aperture running in the sound output direction and arranged relative to the sound transmission volume offset transversely to the sound output direction, and wherein between the sound transmission volume and the sound outlet aperture there is provided a sound guide channel, which runs substantially transversely to the sound output direction and by means of which the sound transmission volume and the sound outlet aperture are acoustically connected and which forms an acoustic mass.

By providing the features according to the invention, in addition to the acoustic mass formed by the sound outlet aperture it is possible in a structurally simple and space-saving manner and at virtually no additional expense to realize an additional acoustic mass by means of at least one designated sound guide channel which forms an acoustic mass by virtue of its dimensioning; in consequence—despite the only small acoustic mass achieved by means of the sound outlet aperture in a housing wall of maximum thinness and despite the only small front chamber volume achieved by means of the smallest possible electro-acoustic transducer—such a large acoustic mass is realized in total that, because of the relatively large acoustic mass realized by means of the at least one sound guide channel, a satisfactory front resonator and consequently a satisfactory band-pass characteristic for the sound pressure frequency response of the electro-acoustic transducer is ensured. By means of the at least one sound guide channel it is therefore possible to realize such a large acoustic mass that the only small contribution of the at least one sound outlet aperture to the total acoustic mass and the only relatively small contribution of the electro-acoustic transducer to the front chamber volume regarding the realization of a satisfactory front resonator are compensated.

In the case of an electro-acoustic apparatus according to the invention, two sound transmission volumes and two sound outlet apertures and two sound guide channels can be provided, each sound transmission volume being acoustically connected to a sound outlet aperture by way of a sound guide channel. It has proved especially advantageous, however, if two sound outlet apertures and just one sound transmission volume are provided, and if a respective sound guide channel is provided between the sound transmission volume and each sound outlet aperture. This is advantageous both in respect of a structural design of maximum simplicity and in respect of good control of the acoustic properties.

In the case of an electro-acoustic apparatus according to the invention having two sound outlet apertures and just one sound transmission volume, viewed in the sound output direction each sound channel can be constructed running in a straight line. In the case of such a construction, either only relatively short sound guide channels or unfavorably large distances between the sound transmission volume and each sound outlet aperture are possible. It has therefore proved very advantageous if each sound guide channel, viewed in the sound output direction, is constructed running in a curve. By virtue of the curved run of each sound guide channel, each sound guide channel has a relatively long length, yet despite the long length of each sound guide channel the direct distance between the sound transmission volume and each sound outlet aperture can be relatively small. As regards the curved shape of each sound guide channel, it should be mentioned that different possible constructions exist. For example, a sound guide channel constructed running in a curve can be constructed running substantially in a U-shape, wherein different length limbs of the U-shaped run can be realized. Such a U-shaped run represents a run with one curve. Alternatively, it is possible to provide a run having several curves, and it even possible to provide an undulating run.

In the case of an electro-acoustic apparatus according to the invention, a construction is possible in which a sound guide channel is formed by means of a gutter-form recess provided in a front-side transducer housing wall and by means of the housing wall of the apparatus lying with its housing inner surface acoustically sealed to the transducer housing wall. In the case of an electro-acoustic apparatus according to the invention, it is furthermore possible to form a sound guide channel in an intermediate member provided between the transducer and the housing wall, the intermediate member consisting, for example, of acoustically tight soft plastics or rubber and at the same time serving to compensate for dimensional tolerances in the sound output direction. In the case of an electro-acoustic apparatus according to the invention it has proved very advantageous, however, if the sound guide channel and the sound transmission volume are formed by means of a gutter-form recess provided in the housing wall and by means of a cup-shaped recess, both recesses opening out into the inner wall surface, and by means of an annular additional member that lies acoustically sealed to the inner wall surface and acoustically tightly seals the gutter-form recess and in which a sound transmission aperture is provided for conducting the generated sound to the sound transmission volume. Such a construction has the great advantage that the gutter-form recess is realized with virtually no additional expense in the manufacture of the housing of the electro-acoustic apparatus and that an additional member, which in many instances of application is necessary anyway, is used to close the gutter-form recess, in order to form the sound guide channel.

In the case of an electro-acoustic apparatus according to the invention having an additional member as mentioned in the preceding paragraph, it has proved very advantageous if the additional member is in the form of an adhesive ring that is arranged between the housing wall and the transducer and which is provided for the purpose of mechanical connection of the transducer with the housing wall. Such a construction offers the advantage that the additional member is used not only for realization of at least one sound guide channel, but additionally also for mechanical connection of the transducer with the housing wall.

In a construction with an additional member in the form of an adhesive ring, it has proved especially advantageous if the additional member in the form of an adhesive ring is provided in the region of its sound transmission aperture with a sound-transmitting mesh, which by virtue of its construction forms a protection against dust. In this way, the additional member used to form the sound guide channel is additionally also used in an advantageous manner to realize a protection against dust.

In the case of an electro-acoustic apparatus having an annular additional member lying acoustically sealed against the inner wall surface of the housing wall, it is furthermore proved very advantageous if a ring seal resiliently deformable at least in the sound output direction is arranged between the additional member and the transducer. Such a construction offers the advantage that dimensional tolerances present in the sound output direction can be compensated in a simple manner by means of the resiliently deformable ring seal.

These and other aspects of the invention are apparent from and will be elucidated, by way of non-limitative example, with reference to the embodiments described hereinafter.

Figure 1:
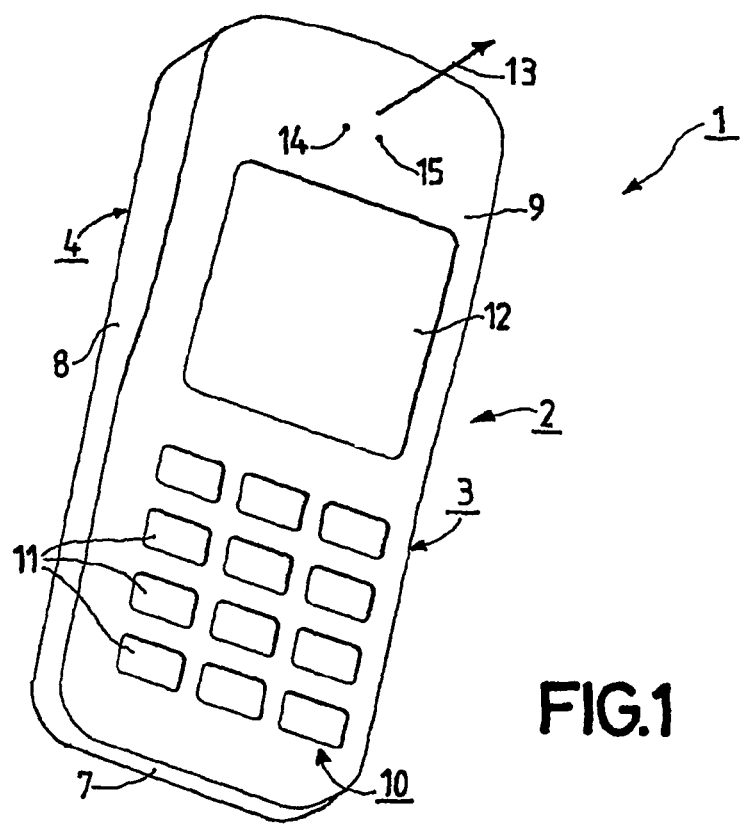
FIG. 1 shows schematically, in an oblique view from the front, an electro-acoustic apparatus according to a first exemplary embodiment of the invention.
Figure 2:
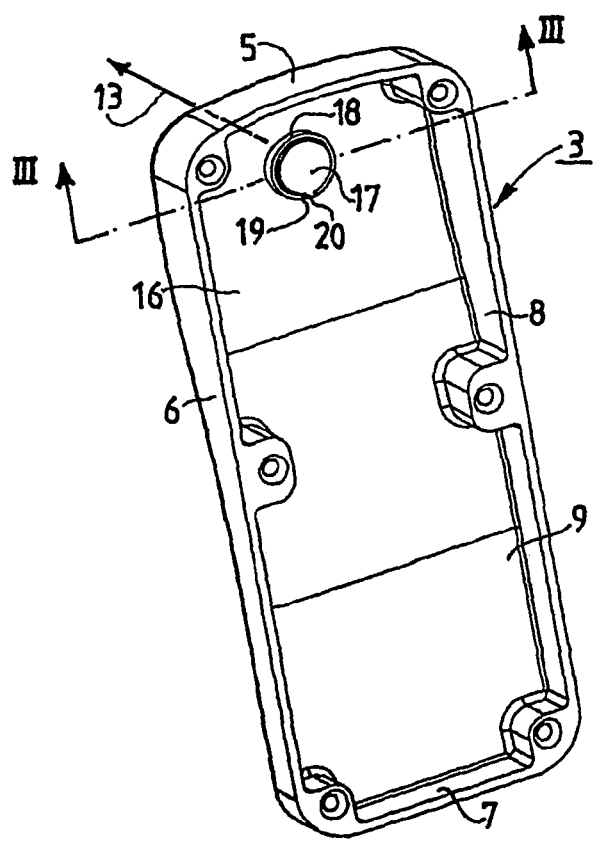
FIG. 2 shows, in an oblique view from the rear, a front housing shell of the apparatus from FIG. 1, which housing shell has a top wall, behind which an electro-acoustic transducer is provided.

FIG. 1 shows an electro-acoustic apparatus 1, which in this particular case is in the form of a mobile telephone and is referred to hereinafter for short as apparatus 1. Such an electro-acoustic apparatus can alternatively, however, be in the form of a "Personal Digital Assistant", abbreviated to "PDA". The apparatus 1 comprises a housing 2. The housing 2 comprises a front housing shell 3 and a rear housing shell 4, which serves to close the housing shell 3. The housing shell 3 (see FIG. 2) has four lateral walls 5, 6, 7 and 8 and a top wall 9. In the region of the top wall 9 there is provided a keypad 10 with in this case twelve keys 11 and a display device 12. The display device 12, indicated merely schematically, is formed by a so-called LCD; alternatively, however, it may be of a different construction.

Two sound outlet apertures 14 and 15 running in a sound output direction 13, which is indicated in FIGS. 1, 2, 3 and 13 with an arrow 13, are provided in the region of the top wall 9 adjoining the lateral wall 5. The top wall 9 is bounded inside the apparatus 1 by an inner wall surface 16.

As is apparent from FIGS. 2, 3, 4 and 10, the apparatus 1 contains an electro-acoustic transducer 17, which is formed by an electrodynamic loudspeaker and which is referred to hereinafter as transducer 17 for short. The transducer 17 has in this case an outer diameter of about 8.0 mm. Alternatively, however, the outer diameter can be even smaller, for example, 7.0 mm or 6.0 mm. The transducer 17 is arranged facing the inner wall surface 16. In this connection, a positioning ring 18 projecting from the top wall 9 in the region of the inner wall surface 16 thereof is provided for the transducer 17 and is equipped with a slot-form positioning opening 19. Protruding laterally from its transducer housing the transducer 17 has a positioning extension 20, which is received in the positioning opening 19, whereby an angular positioning of the transducer 17 is achieved. By means of the positioning ring 18, a cylindrical receiving space AR is defined. The receiving space AR is bounded by a circular wall portion 16A of the inner wall surface 16 and by a cylindrical limiting wall 21.

As is apparent from FIGS. 3, 5, 6, 7, 8 and 11, an annular additional member 22 lying acoustically sealed against the inner wall surface 16, in fact against the wall portion 16A, is received in the receiving space AR. The additional member 22 comprises a carrier ring 23 for a sound-transmitting mesh 24, and the sound transmitting mesh 24 itself, which is not illustrated in FIGS. 7 and 8. Here, the carrier ring 23 is formed by an adhesive ring, which is arranged between the housing wall 16 and the transducer 17 and is provided for the purpose of mechanical connection of the transducer 17 to the housing wall 16. The additional member 22 is provided with a sound transmission aperture 25, through which the sound generated with the transducer 17 can be directed. The sound transmitting mesh 24 is located in the sound transmission aperture 25, the sound transmitting mesh 24 being formed in this particular case by a polyester mesh that by virtue of its construction constitutes a protection against dust. The sound-transmitting mesh 24 additionally also constitutes acoustic friction, with which an influence, which although only small is nevertheless useful, on the frequency response of the transducer 17 is achieved. The carrier ring 23 in the form of an adhesive ring is coated on both sides with an adhesive, the adhesive being airproof so that an acoustically sealed behavior of the carrier ring 23 is consequently ensured.

Figure 3:
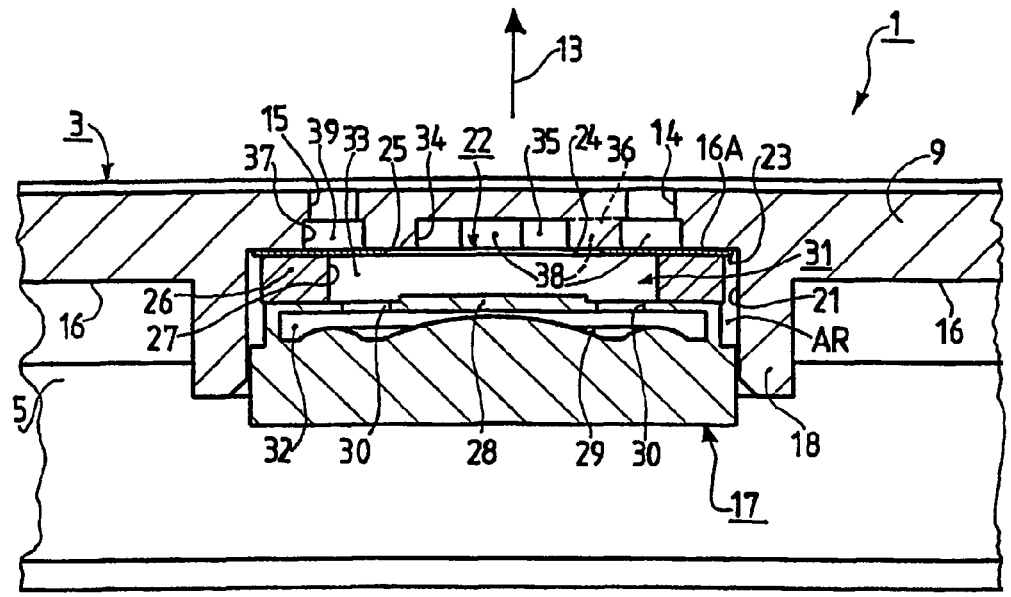
FIG. 3 shows, to an enlarged scale compared with FIG. 2 and in a section along the line III-III in FIG. 2, a portion of the apparatus from FIG. 1, which portion contains the electro-acoustic transducer.
Figure 5:
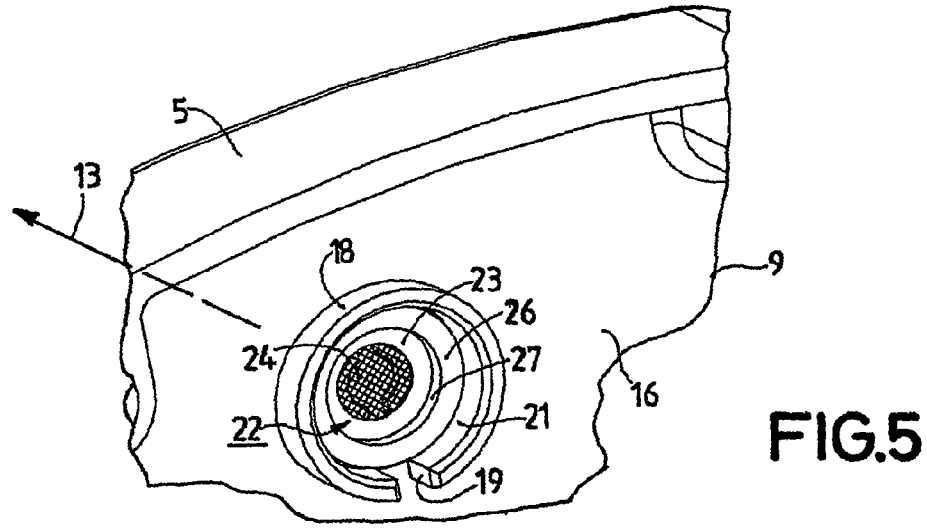
Figure 6:
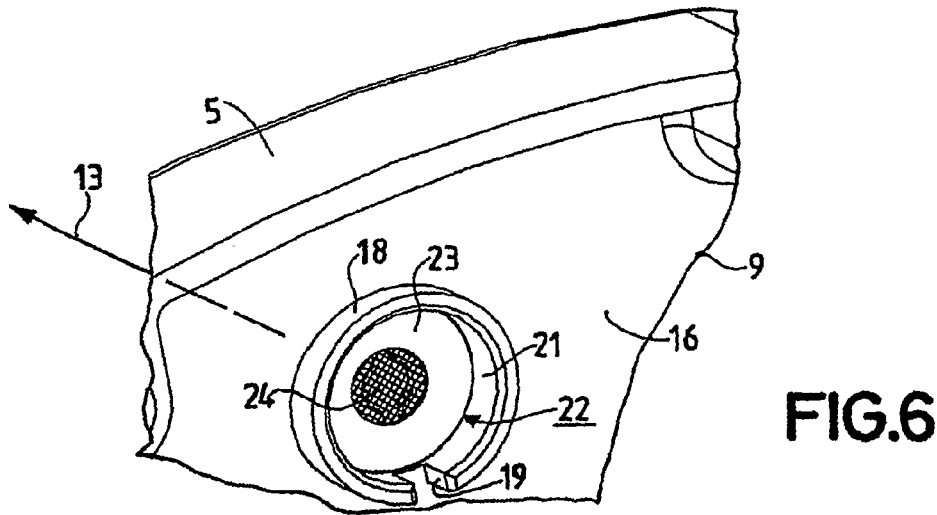
Figure 7:
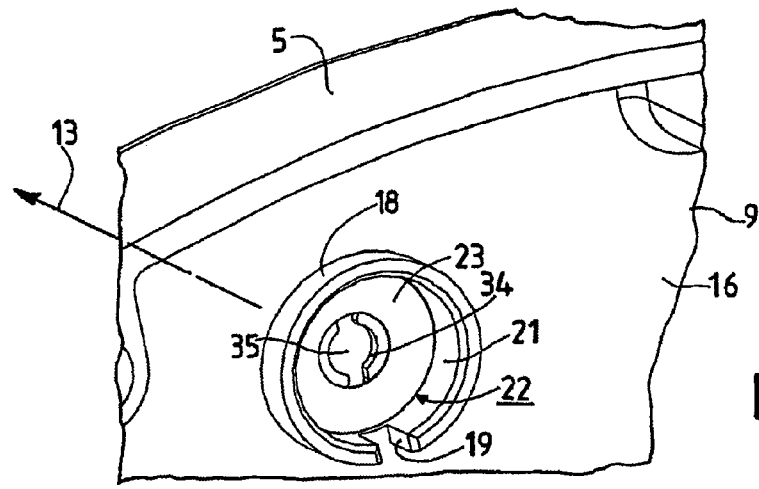
Figure 8:
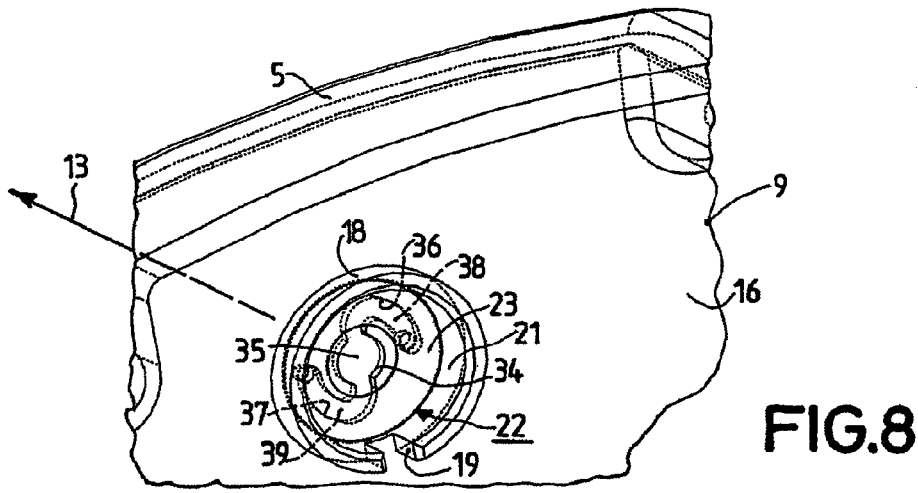
Figure 9:
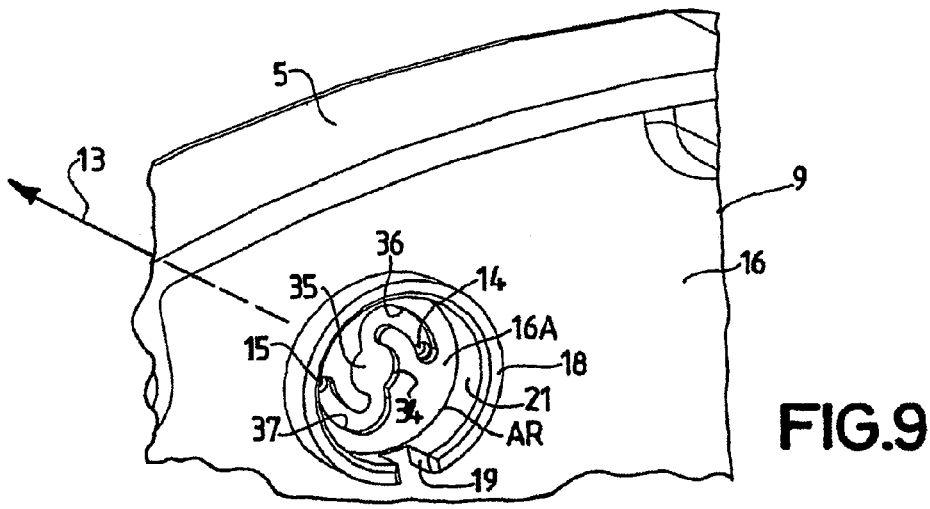
Figure 10:
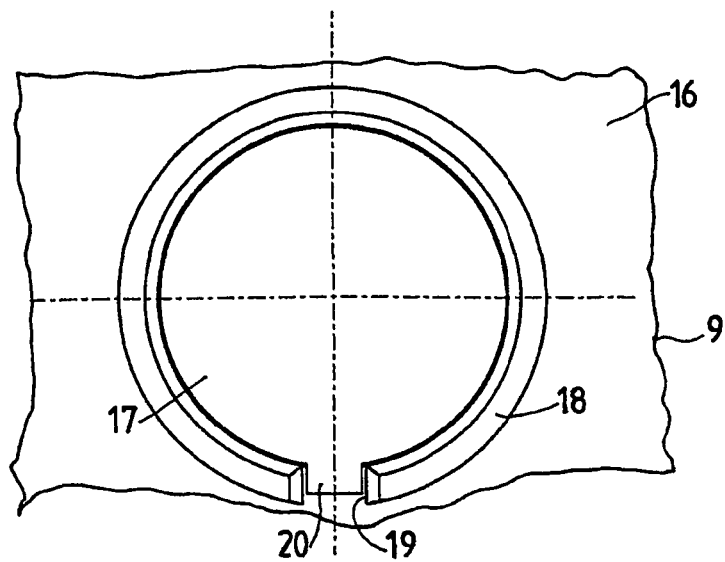
FIGS. 10 to 12 show, in an elevation from the rear, the portion of the housing shell from FIG. 2, which portion of the housing shell is intended for receiving the electro-acoustic transducer.
Figure 11:
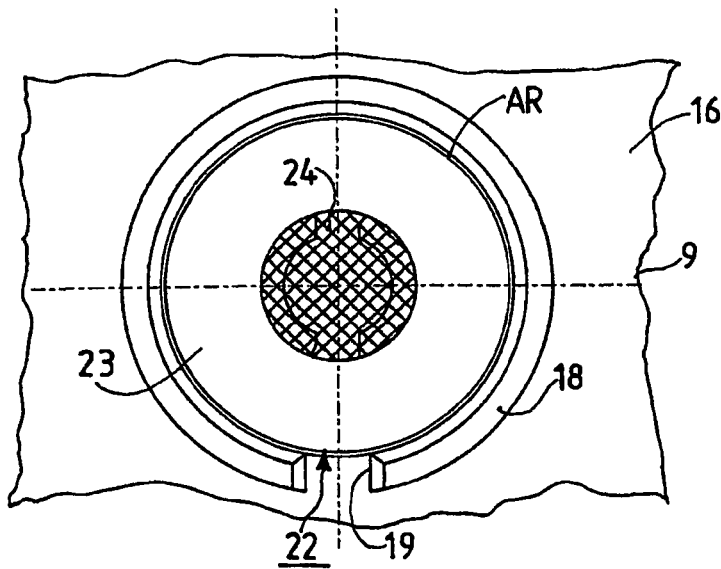
Figure 12:
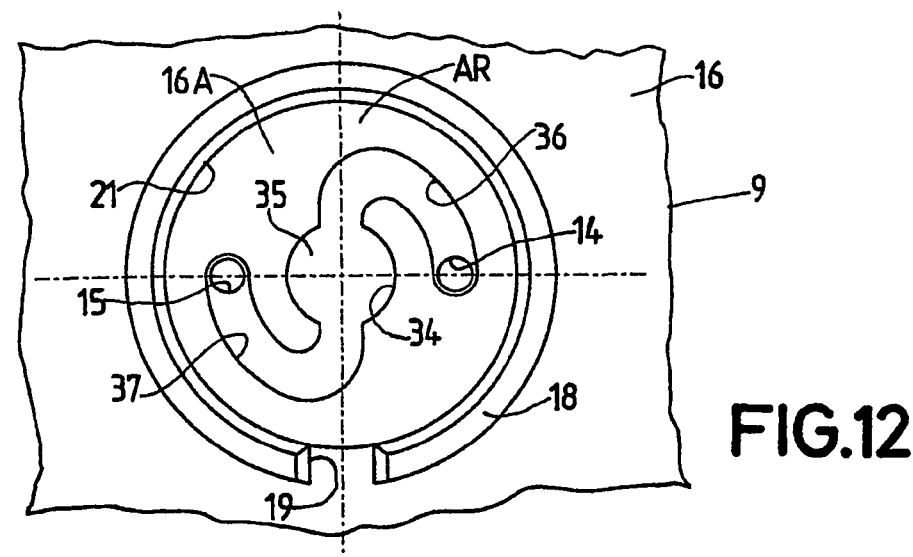

Moreover, as is apparent from FIGS. 3 and 5, a ring seal 26 is provided in the receiving space AR adjoining the annular additional member 22 or rather the carrier ring 23.

The ring seal 26 likewise has a sound transmission aperture 27. The ring seal 26 is provided on its side remote from the annular additional member 22 with a layer of adhesive, which adhesive is likewise airproof, that is, acoustically tight. The ring seal 26 comprises acoustically tight foamed material, and is resilient at least in the sound output direction 13, with the result that the ring seal 26 serves not only for sealing but also to compensate for any height tolerances.

Adjoining the ring seal 26, the transducer 17 is received at least mainly in the receiving space AR. The transducer 17 is provided with a circular disc-shaped front wall 28, which is mechanically connected to the ring seal 26 by means of the layer of airproof adhesive applied to the ring seal 26. The transducer 17 is of a construction known per se, for which reason the transducer 17 is indicated merely schematically in FIG. 3. Only the diaphragm 29 of the transducer 17 is illustrated in detail. In the front wall 28 of the transducer 17 a series of sound transmission apertures 30 are provided, of which sound transmission apertures 30 only two sound transmission apertures 30 are visible in FIG. 3.

The transducer 17 is intended and constructed for generating sound and for emitting the generated sound in the sound output direction. Emission of the generated sound is effected through a front chamber volume 31, which is formed substantially by a first partial volume 32 located between the diaphragm 29 and the front wall 28 of the transducer 17 and by a second partial volume 33 enclosed by the ring seal 26.

As is apparent from FIGS. 3, 7, 8, 9 and 12, in the case of the apparatus 1, in an especially advantageous manner there is provided in the top wall 9 a cup-shaped recess 34, which in this particular case lies opposite the center of the transducer 17 and which opens into the inner wall surface 16, namely, into the wall portion 16A. A sound transmission volume 35 provided inside the apparatus 1 is bounded and hence formed by means of the cup-shaped recess 34. The sound generated with the transducer 17 is arranged to be directed to the sound transmission volume 35 through the sound transmission aperture 25 provided in the additional member 22.

As is further apparent from FIGS. 3, 8, 9 and 12, in the case of the apparatus 1, in an especially advantageous manner a respective gutter-form recess 36, 37 provided in the top wall 9 is provided between the cup-shaped recess 34 and each of the two sound outlet apertures 14 and 15, the two gutter-form recesses 36 and 37 each opening out into the inner wall surface 16, namely, into the wall portion 16A. In this connection, the two gutter-form recesses 36 and 37 are acoustically tightly sealed by means of the annular additional member 22, because the additional member 22 lies acoustically tightly against the inner wall surface 16, namely, the wall portion 16A. By means of each gutter-form recess 36, 37 and the annular additional member 22, a sound guide channel 38 respectively 39 is formed, which in this particular case runs perpendicular to the sound output direction 13, and by means of which the sound transmission volume 35 and the relevant sound outlet aperture 14 respectively 15 are acoustically connected. The cross-sectional dimensions of the sound guide channels 38 and 39 and the length of the sound guide channels 38 and 39 are selected here so that each of the two sound guide channels 38 and 39 forms an acoustic mass. Reference can be made to the technical literature known in circles of experts regarding the formation of acoustic masses. As is apparent from FIGS. 1 to 12, the two sound outlet apertures 14 and 15 are provided or rather arranged offset with respect to the sound transmission volume 35 perpendicular to the sound output direction 13. Furthermore, it is apparent that the gutter-form recesses 36 and 37, and consequently the sound guide channels 38 and 39, are constructed running in a curve, which produces the advantage that the sound guide channels 38 and 39 have a relatively long length, so that in this way relatively large acoustic masses are realized.

Sound generated by means of the transducer 17 is output through the sound transmission apertures 30 provided in the front wall 28 of the transducer 17 into the front chamber volume 31, after which the generated sound channeled through the front chamber volume 31 is directed to the sound transmission volume 35, with the result that the generated sound is channeled at least partially, namely initially in the sound output direction 13, through the sound transmission volume 35. In further succession, the generated sound passes from the sound transmission volume 35 transversely to the sound output direction 13 into the two sound guide channels 38 and 39, which two sound guide channels 38 and 39 channel the generated sound to the sound outlet apertures 14 and 15, through which sound outlet apertures 14 and 15 the generated sound is output in the sound output direction 13. Here, the front chamber volume 31 constitutes an acoustic spring and the two sound guide channels 38 and 39 each constitute an acoustic mass, with the result that by means of the front chamber volume 31 and the two sound guide channels 38 and 39 and the two sound outlet apertures 14 and 15 a front resonator configuration is realized, by means of which a band-pass characteristic of the sound pressure frequency response is achieved in a manner known per se. Despite the smallness of the transducer 17—the outer diameter of which, as mentioned, is 8.0 mm in the present case, so that the front chamber volume has only a relatively small value—the relatively long sound guide channels 38 and 39, which thus contribute to a marked increase in the acoustic mass crucial for the formation of the front resonator, here ensure a good and satisfactory front resonator and consequently a good bandpass characteristic of the sound pressure frequency response.

It should be mentioned that the sound guide channels 38 and 39 need not necessarily run perpendicular to the sound output direction 13, but could alternatively run at an angle other than 90° to the sound output direction 13, that is, could run not perpendicular but transversely to the sound output direction 13.

It should furthermore be mentioned that a construction in which no ring seal is provided is also possible, so that compared with the construction shown in FIGS. 1 to 12 the ring seal 26 can be omitted.

In the case of the above-described apparatus 1 the advantage is gained that the annular additional member 22, which is provided as protection against dust, which member is required anyway and is consequently provided, is additionally used to form the sound guide channels 38 and 39, thus rendering realization of the sound guide channels 38 and 39 at no extra cost, because the gutter-form recesses 36 and 37 and the cup-shaped recess 34 are produced without additional expense during manufacture of the housing shell 3.

In the case of the above-described apparatus 1, the transducer 17 is mechanically connected by way of the ring seal 26 and by way of the annular additional member 22 to the top wall 9, a respective adhesive join being produced between the top wall 9 and the annular additional member 22 and between the annular additional member 22 and the ring seal 26 and between the ring seal 26 and the front wall 28 of the transducer 17. In another solution, the transducer 17 can alternatively be held down in the receiving space AR by means of a holding-down device supported inside the apparatus 1. Such a holding-down device can be realized, for example, by means of at least one spring or by means of a plastics part having resilient properties or by means of already present resiliently constructed connection contacts of the transducer 17.

In the case of the above-described apparatus 1, the electro-acoustic transducer 17 is formed by an electrodynamic transducer, which in known manner comprises a magnet system and an oscillation coil oscillating in an air gap of the magnet system and connected to the diaphragm 29. Instead of such an electro-acoustic transducer, a transducer operating according to a different physical principle could be used, for example, a piezoelectric transducer. The transducer 17 need not necessarily have a circular cross-section; the cross-section could alternatively be oval, elliptical or rectangular with two lateral lengths of 7.0 mm and 11.0 mm.

It should be mentioned that a construction is possible in which no separate sound transmission volume 35 is provided, but in which the sound transmission volume is realized by utilizing the front chamber volume already present.

It should furthermore be mentioned that a construction is also possible in which two sound transmission volumes lying side by side in a direction running transversely to the sound output direction 13 are provided, each sound transmission volume being acoustically connected by way of a sound guide channel to a sound outlet aperture.

Moreover, it should be mentioned that a construction is also possible in which more than two sound outlet apertures are provided, each sound outlet aperture being connected by way of a sound guide channel to a sound transmission volume, wherein just a single sound transmission volume can be provided or alternatively a plurality of sound transmission volumes can be provided, the number of which is at most the same as the number of sound outlet apertures. A construction is also possible in which just one sound outlet aperture and just one sound guide channel and just one sound transmission volume are provided.

Figure 13:
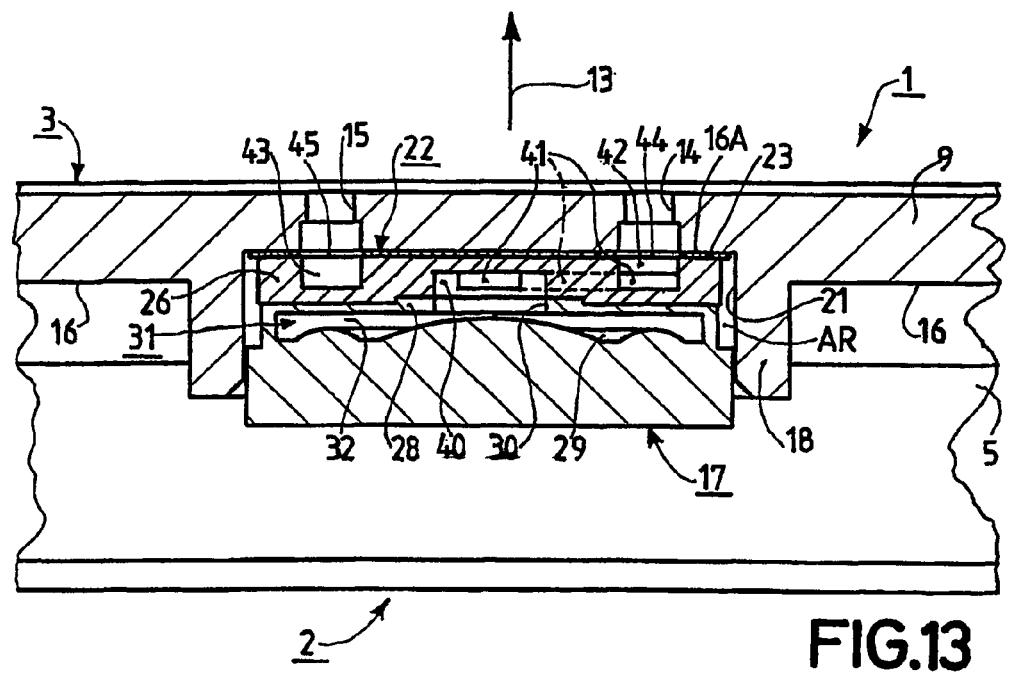
FIG. 13 shows similarly to FIG. 3 a portion of an apparatus according to a second exemplary embodiment in accordance with the invention.
Figure 4:
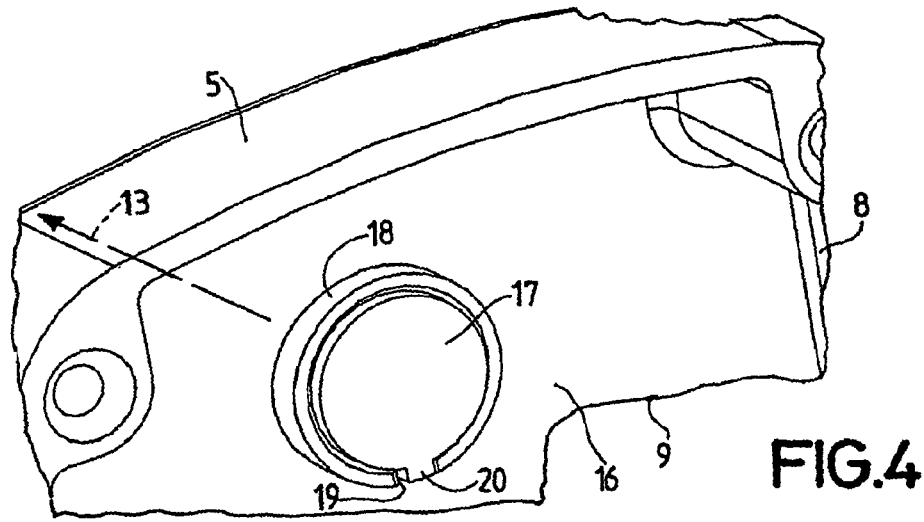
FIGS. 4 to 9 show similarly to FIG. 2, a portion of the housing shell from FIG. 2, which portion of the housing shell is intended for receiving the electro-acoustic transducer.

Similarly to FIG. 3, FIG. 13 illustrates a portion of an apparatus 1 which likewise contains a transducer 17 that is received in a receiving space AR, an annular additional member 22 and a ring seal 26 likewise being provided in the receiving space AR.

Unlike the apparatus 1 described with reference to FIGS. 1 to 12, in the apparatus 1 shown in FIG. 13 a sound transmission volume 40 is provided in the ring seal 26, and two sound guide channels 41, of which only one sound guide channel 41 is illustrated in FIG. 13, are contained in the ring seal 26. Each of the two sound guide channels 41 opens out into a sound output volume 42 and 43, which is connected, so as to transmit sound, by way of a sound transmission aperture 44 respectively 45 in the annular additional member 22 to a respective sound outlet aperture 14, 15. In that case, the increase in the acoustic mass necessary and crucial for the formation of a good front resonator and consequently a good band-pass characteristic of the sound pressure frequency response therefore takes place with the help of the ring seal 26, which in that case likewise comprises an acoustically tight foamed material or another acoustically tight material, namely, a relatively soft plastics material or a rubber material.

In the case of the apparatus 1 described in FIGS. 1 to 12, the cup-shaped recess 34 for forming the sound transmission volume has a circular cross-section. Alternatively, it is possible to provide an elliptical or a square or a hexagonal or other polygonal cross-section. The same applies to the construction of the sound transmission volume 40 in the ring seal 26 in the case of the apparatus 1 shown in FIG. 13.

The invention claimed is:

1. An electro-acoustic apparatus having a housing with a housing wall that is defined by an inner wall surface, and having an electro-acoustic transducer that is arranged facing the inner wall surface, wherein the transducer is provided and constructed to generate sound and to emit the generated sound in a sound output direction right through a front chamber volume, and wherein inside the apparatus a sound transmission volume is provided, through which the generated sound channeled right through the front chamber volume can be channeled at least partially in the sound output direction, and wherein in the housing wall there is provided a sound outlet aperture running in the sound output direction and arranged relative to the sound transmission volume offset transversely to the sound output direction, and wherein between the sound transmission volume and the sound outlet aperture there is provided a sound guide channel, which runs substantially transversely to the sound output direction and by means of which the sound transmission volume and the sound outlet aperture are acoustically connected and which forms an acoustic mass; and wherein the sound guide channel and the sound transmission volume are formed by means of a gutter-form recess and a cup-shaped recess provided in the housing wall, both recesses opening out into the inner wall surface, and by means of an annular additional member that lies acoustically tight against the inner wall surface and acoustically tightly seals the gutter-form recess and in which a sound transmission aperture is provided for conducting the generated sound to the sound transmission volume.

2. An apparatus as claimed in claim 1, wherein when the additional member is in the form of an adhesive ring that is arranged between the housing wall and the transducer and which is provided for the purpose of mechanical connection of the transducer to the housing wall.

3. An apparatus as claimed in claim 1, wherein the additional member in the form of an adhesive ring is provided in the region of its sound transmission aperture with a sound-transmitting mesh, which by virtue of its construction forms a protection against dust.

4. An apparatus as claimed in claim 1, wherein a ring seal that is resiliently deformable at least in the sound output direction is arranged between the additional member and the transducer.

* * * * *